Dec. 27, 1932.  H. W. BUNDY  1,892,607
METHOD FOR MAKING A TUBE
Filed Jan. 31, 1931
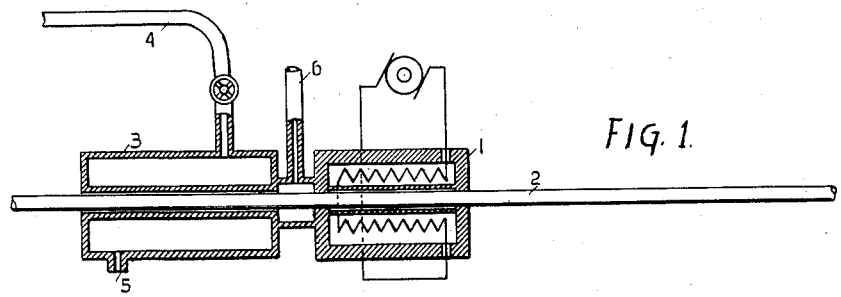
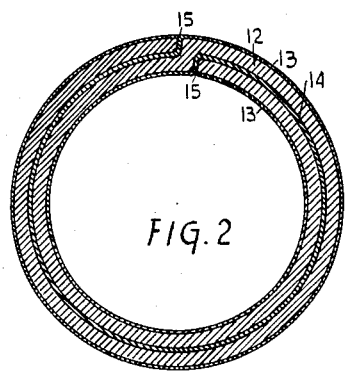
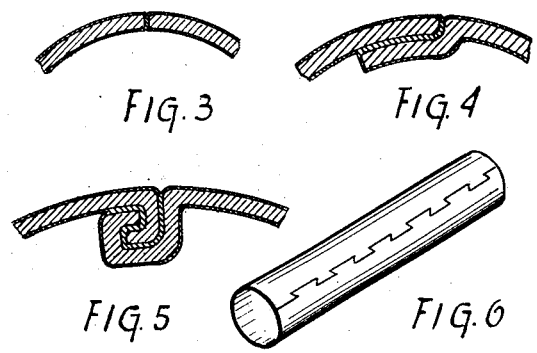
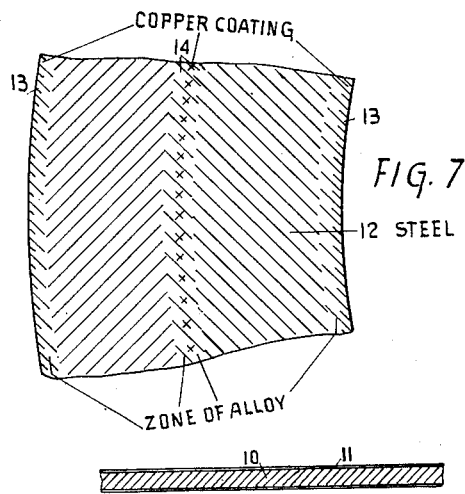
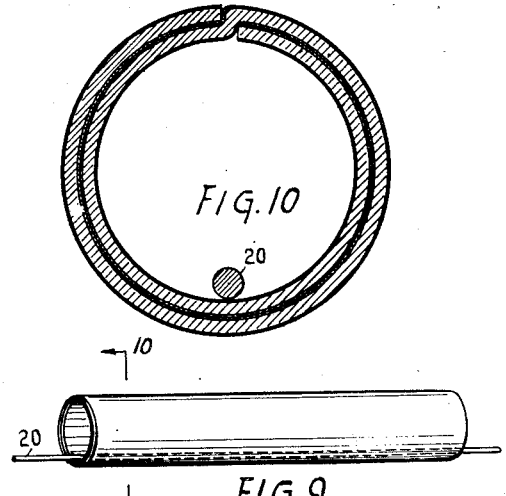
INVENTOR.
HARRY W. BUNDY
BY *Barnes & Kisselle*
ATTORNEYS.

Patented Dec. 27, 1932

1,892,607

UNITED STATES PATENT OFFICE

HARRY W. BUNDY, OF DETROIT, MICHIGAN, ASSIGNOR TO BUNDY TUBING COMPANY, OF DETROIT, MICHIGAN, A CORPORATION OF MICHIGAN

METHOD FOR MAKING A TUBE

Application filed January 31, 1931, Serial No. 512,673, and in Sweden October 27, 1930.

This invention has to do with a method for making tube, and one of the principal objects of the invention is the provision of a tube in which overlapping or juxtapositioned parts are weld-united, and in which the tube is covered with a protective coating, preferably of corrosion-resisting metal, which coating is applied to the tube so that it will not flake or peel off. This application is a continuation in part of my prior applications Serial No. 320,822, filed November 21, 1928 and Serial No. 403,764, filed Oct. 31, 1929.

In accordance with the invention tubing is provided which is formed basically of metal stock sealed by having its overlapping or juxtapositioned parts weld-united by a binding metal, and the metals employed in the basic stock and in the binding metal are preferably such that they have affinity one for the other. The binding or sealing metal is employed not only as a welding medium but also as a coating medium for covering the inside, the outside, or both of the tube. By utilizing metals at least one of which has affinity for the other, the union between overlapping or juxtapositioned parts may be properly termed a weld because the metals firmly unite by alloying with each other. At the same time the coating is securely united to the tubular form because the metals alloy with each other. The metals which may be employed are subject to variation; for example, the basic metal employed may be ferrous metal such as steel, while the binding metal which performs the function of a welding medium and coating medium may be copper. The binding metal employed advantageously should have a melting point lower than that of the basic metal. By way of example, it may be pointed out that other binding metals which may be employed with ferrous or steel basic metal are copper alloys such as monel, constantan and copper-silver or copper-gold alloy. Metals other than ferrous may be employed as the basic tube-forming metal, and in this regard an alloy containing nickel such as nickel steel or monel may be employed, the affinity of nickel for copper being high so that binding metal of copper or copper alloy may advantageously be used. A tube employing Monel or similar metal as its basic structural metal is claimed in a separate application.

In carrying out the method the welding and coating operations are performed under conditions which will permit the binding and coating constituent to "wet" the surfaces of the basic tube-forming metal. To this end the metals are subjected to heat in a non-oxidizing or reducing environment, preferably by utilizing a furnace in which a reducing atmosphere is maintained. For this purpose an atmosphere of hydrogen is advantageous although other gases may be employed, as for example carbon monoxide or a gas composed substantially of 75% $H_2$, 20% CO, and 5% nitrogen which may be obtained by cracking ordinary illuminating gas.

The method, the tube, and a diagrammatic illustration of an apparatus which may be employed in carrying out the method are depicted in the accompanying drawing wherein:

Fig. 1 is a diagrammatic view in illustration of a furnace and cooling chamber through which a tube is passed for the heat treatment.

Fig. 2 is a cross-sectional view of a tube having plural-ply walls which may be made by the present invention.

Figs. 3, 4 and 5 are views showing in section a butt seam, a lapped seam, and a lock seam, respectively, which are types of seams which may be employed.

Fig. 6 is a perspective view of a tube employing a type of butt seam wherein the abutting edges have interengaging projections and recesses.

Fig. 7 is an enlarged sectional view showing the wall of a plural-ply tube and illustrating the zones of steel, the zones of coating metal, and the zones of alloy.

Fig. 8 is a sectional view taken through a strip of stock having a covering or plating of copper which may be employed in the making of the tube.

Fig. 9 shows a tube provided with an additional supply of copper.

Fig. 10 is an enlarged sectional view taken on line 10—10 of Fig. 9.

Referring now to the drawing, there is shown at 1 a furnace that is advantageously an electric or other muffle furnace having a central passageway through which a tube may be passed. As viewed in this figure, the tube is to be moved from right to left and after passing through the furnace where it is subjected to the requisite heat it passes through a cooling chamber. This cooling chamber is shown at 3 in the form of a water jacket, the water entering the jacket through a valve controlled conduit 4 and discharging from spout 5. During the heating step a reducing environment is provided and this environment is preferably maintained until the copper has set. The reducing gas may be supplied through conduit 6 which communicates with both the furnace and the cooling chamber as shown. The hydrogen flows through the cooling chamber and furnace and discharges at the inlet end of the furnace and the outlet end of the cooling chamber.

The binding and coating constituent may advantageously be provided and carried into the furnace in the form of a covering or plating upon the strip of metal which forms the basic tube structure. The basic metallic structure or strip stock 10 (Fig. 8) has thereon a covering or plating of the binding or coating metal, as shown at 11. Stock of this nature may be formed into tube and then passed through the heating zone. This covering or plating may be provided in a number of ways. One advantageous manner is to electroplate the binding and coating metal onto the basic metal; or the basic metal may be covered by spreading thereon copper powder mixed with a carrier and heating it.

In making the tube, the binding and coating metal, when heated in the hydrogen or reducing atmosphere, has the capacity of "wetting" the underlying basic metal. Also the molten binding and coating metal flows or creeps or is drawn into the seam or between overlapping parts, and this is believed to be due to capillarity. In this regard the metal required to fill in a seam or between plies and effect a solid weld is supplied from the exposed coating due to the creeping or flowing or migrating of the coating or binding metal. At the same time sufficient coating and binding metal is provided to permit some of it to alloy with the underlying basic metal leaving a coating over the tube. At some places the tube seam structure or overlapping ply structure may be such as to require a considerable amount of metal to fill in and effect a solid weld, and it is believed that due to the shifting of the coating metal, no portion of the coating is robbed due to supplying metal for the weld because the metal adjusts itself due to its free migrability in the reducing atmosphere, satisfying the seams, joints or overlapping parts, and then forming a coating of substantially uniform thickness.

With reference to Fig. 2, it will be noted that a double ply 12 is completely covered by a coating 13, both inside and out, and in between the plies the coating metal 14 is united. Moreover, the shifting of the metal permits some of the coating metal to flow or creep into the seam or crevices as at 15, thus securely sealing these points and by the same token covering and alloying with the exposed edges of the stock. And the same thing is true of tubes which have joints or seams, as illustrated in Figs. 3, 4, 5 and 6. Fig. 7 is enlarged to depict more clearly the formation of the tube. In this view it will be noted that the basic metal 12 is covered by a coating which coating is united to the basic metal through the medium of alloy zones which zones may otherwise be termed copper-bearing zones of the steel where these metals are employed. The outer coating which remains after some of the coating metal has alloyed with the basic metal fuses together between the plies of a multi-ply stock and/or in seams of various constructions.

It is to be noted that a sufficient amount of coating and binding metal is provided to effect these results, and as above pointed out these results may be accomplished by providing a plating or covering of sufficient thickness to provide an adequate supply of the metal. In other words, the covering of the binding metal is of sufficient thickness to supply sufficient metal for welding adjacent parts of the tube stock together, and to also provide sufficient metal to substantially uniformly coat the tube to the thickness desired. Good results have been obtained by electroplating a strip with approximately .15 ounce of binding metal per square foot of stock for both sides of the stock, as determined by the now available measuring processes. It is to be understood that the invention is not limited to this thickness as the same is subject to variation. For example, more coating metal may be employed to give considerably greater thickness of coating over the tube. Another method of providing a sufficient amount of coating metal is to run in an additional supply. For example, as shown in Figs. 9 and 10, a plated tube may be passed through a furnace with an additional supply of metal which may be in the form of a wire 20 inserted within the tube. In this case the metal over the stock may not be so thick as the plating utilized where no additional coating metal is provided; on the other hand, if a relatively great thickness of coating is desired in a tube for any reason, a relatively thick plating and also the additional metal may be employed. Due to the migrability of the coating metal in its heated condition and in a reducing atmosphere, the metal of the wire 20 will migrate over the surfaces of the tube and in between the plies; in other words, the metal of the wire 20, although within the tube and although the seam is at the upper portion of the tube, will migrate up the walls of the tube and in between the plies. Additional metal may be in the form of powder or blocks of metal placed inside or outside of the tube.

An advantageous manner of practicing the method is that of passing a length of tube lengthwise through a furnace and in this regard the tube may be of relatively great length. The movement of the tube through the furnace is preferably quite uniform and various factors are coordinated to obtain the desired results. The melting point of copper is about 1983° F. and the copper must be heated to a point somewhere in this vicinity. The temperature in the furnace may be maintained at a point higher than the melting point of copper but in conjunction with this it is to be appreciated that the tube is constantly moving through the heated zone. Accordingly the temperature within the furnace, the speed of movement of the tube, the length of the furnace, and possibly also the quantity of metal embodied in a particular tube are factors which must be considered, the speed of movement of the tube being coordinated with the temperature and length of the furnace to obtain the desired results and to the end that the tube is subjected to an effective welding temperature for a period sufficient to secure the alloying, welding, and uniform coating. In other words, the temperature and the time element are related to each other. Satisfactory results have been accomplished by utilizing a furnace about six feet long, maintaining therein a temperature of about 2000° F., and moving a tube through the furnace at the rate of about two feet per minute. The tube had an outside diameter of 3/8", was made of strip steel stock of about .015" thickness, fashioned to provide a tube wall of double thickness, and weighed about one pound to eight feet.

It will be understood that the example given above is for purpose of illustration only and that the various conditions stated may be varied provided they are properly coordinated to obtain the desired results of an effective welding of the seams and plies, alloying of the copper and steel and a coating of the tube. It is pointed out that in the example given a single tube furnace was employed; and that if higher temperature were used the speed of movement of the tube through the furnace could be increased or a number of tubes could be simultaneously passed through the furnace. The object being to uniformly coat and effectively weld the seams of the tubes, and it being necessary to subject the tubes to a welding temperature for a period sufficient to effect this result, any change in the speed of movement of the tubes or the number of tubes which were being simultaneously processed would have to be coordinated with the furnace temperature to provide a welding temperature of the tube for a period long enough to produce the welding action. It is further pointed out that an undue exposure of the tube or tubes to a temperature in excess of that necessary to effect the welding action would first result in an impairment of the coating and then of the weld and ultimately in a destruction of the same.

In so treating a steel tube coated inside and outside with a layer of copper, it is necessary in order to secure an effective welding of the seams and plies with the desired alloying and uniform coating by the copper to subject the tube to the proper temperature for the proper time. The copper absorbs the heat faster than the steel and the temperature to which the tube is subjected and time interval during which the tube is subjected to the heat should be coordinated so that the heat absorption by the copper does not reach a point at which the copper "runs" before the steel is heated to a point where it absorbs copper, resulting in a spotted appearance on the outside of the tube.

On the inside of the tube, however, this condition will not be encountered and, in case the presence of a uniform outer coating is not essential, the necessity for close regulation of the temperature is absent and a degree of heat in excess of that indicated in the above example may be employed with the other factors remaining substantially the same. This is because the steel shields the copper coating inside the tube from a sudden and undue absorption of heat, the result being that the temperature of the steel is raised to the desired alloying point by the time the copper inside the tube has been fused, with the result that the copper will migrate freely to weld the seams and plies effectively, to effect the desired alloying with the steel, and to coat the interior of the tube uniformly. Inasmuch as this is effected in a non-oxidizing environment the tube will be free of deleterious oxides and the coating of copper within the tube will be smooth and uniform even though a temperature is used that may result in a running of the copper on the outside of the tube with a consequent spotted appearance. This may be allowable in cases where the desired objects are only the effective welding of the seams and plies and a uniform coating of copper inside the tube, the conditions of use being such that the presence of a uniform coating of copper on the outside of the tube is not essential.

The above example is given for steel and copper. Various other metals which may be used have different melting points, in which case the factors would be varied; as for example, the maintaining of a higher or lower temperature. The steel under these conditions becomes highly heated, in some instances approaching a white heat, and at this time the copper is sufficiently mobile to spread or migrate over the surfaces, forming an alloy therewith.

The completed tube is substantially free of fusion oxides, and under regulated control the tube may come out of the cooling chamber bright and clean. Moreover, the sub-surface metal is free of fusion oxides, or in other words, oxides which might otherwise have been formed in the furnace save for the maintaining of an environment effective to eliminate oxides and to prevent oxidation.

The cooling step may be controlled to effect determined metal characteristics in the finished product; for example, the tube may be relatively slowly cooled so as to anneal the metal therein, particularly where the tube stock is of steel. This renders the tube pliable so that it can be easily handled, wound upon a reel or the like, and capable of being bent on short radii in the making of various articles such as coils or the like, or bending around corners.

In the claims reference is made to a non-oxidizing environment which prevents the formation of deleterious oxides. The environment to be employed may include any suitable gas or mixture of gases effective for this purpose, such as reducing gases, non-oxidizing gases combined with reducing gases or reducing material, etc. The environment is such as actually to reduce oxides, if any, with which the tube may be fouled when it enters the furnace, and to combine with any oxygen present or to exclude such oxygen and shield the tube therefrom so as to prevent the formation of deleterious oxides. The term "non-oxidizing environment" is employed in a broad sense to include any suitable environment which accomplishes the result of eliminating deleterious oxides.

The tube as it comes from the machine has none of the black oxides usually present when copper is fused, and is free of deleterious oxides. As the finished tube is allowed to stand in contact with the air, some slight surface oxidation and dulling of the coating may take place in course of time, but this does not interfere with the utility and value of the product. The term "free from deleterious oxides" is used in the appended claims to define a coated tube having these characteristics.

While the reference in the claims is to "copper" and "steel" it is the intent, and it is to be understood, that these expressions are meant to cover any other pair of metals having different melting points and which, subjected to the described procedure, would produce a composite tube wherein the metals would be alloyed, the seams and plies effectively welded and the desired coating effected.

I claim:

1. The method of making a tube which consists of forming strip stock of ferrous or similar metal of a fusing point higher than copper and coated with copper, in which the coating approximates a thickness such as given by the uniform distribution by electrolytic deposition of approximately .15 ounce of copper per square foot of stock for both sides of the stock, the stock being approximately .015 inch in thickness, into a tube having portions of the coated stock overlapped and in contact and having an outside diameter of approximately three-eighths of an inch, then heating the tube by passing it through a non-oxidizing environment such as provided by a furnace filled with hydrogen and approximately six feet in length having a temperature of approximately 2000° F., said tube being progressed at a rate of substantially two feet per minute, and then cooling the tube in a non-oxidizing environment.

2. The method of making a tube which consists in electroplating a layer of copper on both sides of a steel strip, forming the strip into a tube, passing the tube through a heating zone at a substantially uniform rate and in a non-oxidizing environment and at a temperature high enough to alloy the copper with the steel and weld the seams of the tube, coordinating the speed of movement of the tube with the period of application of effective welding temperature to the tube to alloy the copper coating with the steel over both sides of the strip and to weld the overlapping portions of the strip together, the copper supplying material for the weld and being sufficient in amount to leave a substantially uniform coating on the surface of the finished tube, proportioning the period of treatment to the temperature to prevent running of the coating on the tube, and cooling the tube in a non-oxidizing environment whereby a welded and uniformly coated tube substantially free from deleterious oxides is produced by a single heat operation.

3. The method of making a welded and coated multiply tube from copper coated strip steel stock formed into tube form which consists in passing the formed tube at a substantially uniform rate through a heating zone at a temperature high enough to alloy the copper with the steel and to weld the seams and plies of the tube in a non-oxidizing environment and then cooling the tube in a non-oxidizing environment, the quantity of copper being sufficient to supply material for the weld and to provide a coating for the tube, and regulating the period of application of effective welding temperature to the tube to obtain welding of the plies and seams, alloying of the coating metal with the steel and a coating for the tube that is free from deleterious oxides in a single heat operation.

4. The method of making a welded and coated tube from copper coated strip steel stock formed into tube form so as to provide overlapping and contacting portions of the coated stock which consists in passing the formed tube at a substantially uniform rate through a heating zone at a temperature high enough to alloy the copper with the steel and to weld overlapping and contacting portions in a non-oxidizing environment and then cooling the tube in a non-oxidizing environment, the quantity of copper being sufficient to supply material for the weld and to provide a coating for the tube, and providing a period of application of effective welding temperature to the tube sufficient to obtain welding of the overlapping and contacting portions, alloying of the coating metal with the steel and a coating for the tube that is free from deleterious oxides in a single heat operation.

5. The method of making a welded and coated tube from copper coated strip steel stock formed into tube form so as to provide overlapping and contacting portions of the coated stock which consists in passing the formed tube at a substantially uniform rate through a heating zone at a temperature high enough to alloy the copper with the steel and to weld overlapping and contacting portions in a non-oxidizing environment, the quantity of copper being sufficient to supply material for the weld and to provide a substantially uniform coating on the surface of the tube, regulating the period of application of effective welding temperature to the tube to obtain welding of the overlapping and contacting portions, alloying of the coating metal with the steel and a coating for the tube in a single heat operation, and cooling the treated tube in a non-oxidizing environment, the tube being free from deleterious oxides.

6. The method of making welded and coated multiply tube from copper coated ferrous strip stock of tubular form in cross section and having overlapping plies lengthwise thereof which consists in passing the formed tube through a furnace at a temperature high enough to alloy the copper with the ferrous stock and to weld the seams and plies of the tube and in a non-oxidizing environment, coordinating the speed of movement of the tube with the period of application of effective welding temperature to the tube and the amount of metal in the copper coating so that the copper alloys with the ferrous stock and forms a substantially uniform coating for the tube and the copper coating on the juxtapositioned surfaces of the overlapping plies fuse-welds together to unite said parts and seal the tube in a single heat operation, and cooling the treated tube in a non-oxidizing environment.

7. The method of making welded and coated tube from copper coated ferrous strip stock of tubular form in cross section and having overlapping contacting portions which consists in passing the tube through a zone of heat application at a substantially uniform rate and at a temperature high enough to alloy the copper with the ferrous stock and to weld overlapping and contacting portions in a non-oxidizing environment, the quantity of copper being sufficient to supply material for the weld and to provide a coating for the tube, providing a period of application of effective welding temperature to the tube sufficient to obtain welding of the overlapping and contacting portions, alloying of the coating metal with the steel and a coating for the tube that is free from deleterious oxides in a single heat operation, and annealing the tube by slowly cooling the same in a non-oxidizing environment.

8. The method of making a welded and coated tube from copper coated strip steel stock formed into tube form so as to provide overlapping and contacting portions of the coated stock which consists in passing the formed tube through a zone of heat application at a substantially uniform rate and at a temperature high enough to alloy the copper with the steel and to weld overlapping and contacting portions in a non-oxidizing environment while adding additional copper, the copper being in amount sufficient to satisfy the weld and provide a coating for the tube, coordinating the speed of movement of the tube with the period of application of effective welding temperature to the tube to obtain welding of the overlapping and contacting portions, alloying of the coating metal with the steel and a coating for the tube that is free from deleterious oxides in a single heat operation and cooling the tube in a non-oxidizing environment.

9. The method of making a welded and coated multiply tube from copper coated ferrous strip stock which consists in passing the formed tube through a zone of heat application at a substantially uniform rate and at a temperature high enough to alloy the coating metal with the ferrous stock and to weld the seams and plies of the tube in a non-oxidizing environment while adding additional copper, the copper being in amount sufficient to satisfy the weld and provide a coating for the tube, coordinating the speed of movement of the tube with the period of application of effective welding temperature to the tube to obtain welding of the plies and seams, alloying of the coating metal with the ferrous stock and a coating for the tube that is free from deleterious oxides in a single heat operation, and cooling the tube in a non-oxidizing environment.

10. The method of manufacturing tube fabricated from strip steel stock and which tube when finished has parts welded together with copper, which comprises coating strip steel stock with copper, fashioning the coated strip steel stock into tube form of relatively great length when considered with the length of the heating and cooling zones, portions of the stock overlapping, moving the tube lengthwise with substantially uniform speed, passing successive sections of the tube through a zone of application of effective welding temperature to the tube in a non-oxidizing environment to subject successive sections to substantially like heating effects for melting the copper and uniting the overlapping portions, coordinating the speed of movement of the tube with the period of application of effective welding temperature to the tube to obtain welding of said overlapping portions and alloying of the copper coating with the steel stock, and then passing successive sections of the tube through a cooling zone in a non-oxidizing environment and before the tube is exposed to oxidizing conditions.

In testimony whereof I affix my signature.

HARRY W. BUNDY.